(12) United States Patent
Hommmes et al.

(10) Patent No.: US 7,175,883 B2
(45) Date of Patent: Feb. 13, 2007

(54) POLYSILOXANE SOLS METHOD FOR THE PRODUCTION AND USE THEREOF

(75) Inventors: Peter Hommmes, Zell am Main (DE); Manuela Niemeier, Münster (DE); Heinz-Peter Rink, Münster (DE); Jochen Henkelmann, Mannheim (DE); Lucien Thiel, Limburgerhof (DE)

(73) Assignee: BASF Coatings AG, Münster (DE)

( * ) Notice: Subject to any disclaimer, the term of this patent is extended or adjusted under 35 U.S.C. 154(b) by 107 days.

(21) Appl. No.: 10/498,784

(22) PCT Filed: Dec. 30, 2002

(86) PCT No.: PCT/EP02/14796

§ 371 (c)(1), (2), (4) Date: Jun. 11, 2004

(87) PCT Pub. No.: WO03/057761

PCT Pub. Date: Jul. 17, 2003

(65) Prior Publication Data

US 2005/0090635 A1 Apr. 28, 2005

(30) Foreign Application Priority Data

Jan. 12, 2002 (DE) ................ 102 00 929

(51) Int. Cl.
*B05D 1/00* (2006.01)
(52) U.S. Cl. .............. 427/387; 528/38; 528/32
(58) Field of Classification Search ................ 427/387; 528/38, 32
See application file for complete search history.

(56) References Cited

U.S. PATENT DOCUMENTS

| | | |
|---|---|---|
| 4,268,542 A | 5/1981 | Sakakibara et al. |
| 4,675,234 A | 6/1987 | Sach et al. |
| 4,746,366 A | 5/1988 | Philipp et al. |
| 4,754,014 A | 6/1988 | Ryntz et al. |
| 4,895,910 A | 1/1990 | Isozaki et al. |
| 5,051,473 A | 9/1991 | Tabuchi et al. |
| 5,079,312 A | 1/1992 | Isozaki et al. |
| 5,221,329 A | 6/1993 | Tarr |
| 5,233,006 A | 8/1993 | Wolter et al. |
| 5,262,362 A | 11/1993 | Covino-Hrbacek |
| 5,300,320 A | 4/1994 | Barron et al. |
| 5,356,669 A | 10/1994 | Rehfuss et al. |
| 5,385,988 A | 1/1995 | Yamamoto et al. |
| 5,412,016 A | 5/1995 | Sharp |
| 5,425,970 A | 6/1995 | Lahrmann et al. |
| 5,474,811 A | 12/1995 | Rehfuss et al. |
| 5,486,384 A | 1/1996 | Bastian et al. |
| 5,580,614 A | 12/1996 | Amberg-Schwab et al. |
| 5,601,878 A | 2/1997 | Kranig et al. |
| 5,605,965 A | 2/1997 | Rehfuss et al. |
| 5,670,257 A | 9/1997 | Sakai et al. |
| 5,686,531 A | 11/1997 | Engelke et al. |
| 5,716,678 A | 2/1998 | Röckrath et al. |
| 5,717,125 A | 2/1998 | Wolter et al. |
| 5,789,085 A | 8/1998 | Blohowiak et al. |
| 5,814,410 A | 9/1998 | Singer et al. |
| 5,853,809 A | 12/1998 | Campbell et al. |
| 5,952,044 A | 9/1999 | Deichmann et al. |
| 5,965,213 A | 10/1999 | Sacharski et al. |
| 5,973,068 A | 10/1999 | Yamaya et al. |
| 5,989,687 A | 11/1999 | Li |
| 5,998,504 A | 12/1999 | Groth et al. |
| 6,103,816 A | 8/2000 | Swarup et al. |
| 6,228,974 B1 | 5/2001 | McCollum et al. |

(Continued)

FOREIGN PATENT DOCUMENTS

CA 2102169 5/1994

(Continued)

OTHER PUBLICATIONS

English Language Abstract for DE19910876/EP1036827 from EPO, Oct. 5, 2000.

(Continued)

*Primary Examiner*—Kuo-Liang Peng

(57) ABSTRACT

Polysiloxane sols preparable by subjecting
(1) in a first stage
  (A) a silicon compound of the general formula I:

$$(Z_oL-)_mSi(H)_n(R)_p,\qquad (I)$$

which is free of carbamate groups and where
    o is an integer from 1 to 5;
    m is 0, 1, 2 or 3;
    n is an integer from 1 to 4;
    p is 0, 1, 2 or 3;
    Z is a reactive functional group, excluding carbamate group;
    L is an at least divalent, linking, organic group;
    H is a hydrolyzable, monovalent, organic group or hydrolyzable atom;
    R is a nonhydrolyzable, monovalent, organic group;
  to partial hydrolysis and condensation in the presence
  (B) of at least one crosslinking agent, and then subjecting
  (2) in a further stage, the reaction mixture (1) to complete hydrolysis and condensation with
  (C) a hydrolyzable, carbamate-functional silicon compound of the general formula II:

$$\{[HR^1N-(O)C-O-]_sL-\}_sSi(H)_t(R)_u\qquad (II)$$

where
    $R^1$ is a hydrogen atom or group R;
    r is an integer from 1 to 5;
    s is 1, 2 or 3;
    t is 1, 2 or 3;
    u 0, 1 or 2;
and their use as coating materials, adhesives, and sealing compounds and also for producing optical moldings and self-supporting films.

22 Claims, No Drawings

U.S. PATENT DOCUMENTS

| | | |
|---|---|---|
| 6,288,198 B1 | 9/2001 | Mechtel et al. |
| 6,309,707 B1 | 10/2001 | Mayer et al. |
| 6,403,699 B1 | 6/2002 | Röckrath et al. |
| 6,419,989 B1 | 7/2002 | Betz et al. |
| 6,620,514 B1 | 9/2003 | Arpac et al. |
| 6,713,559 B1 | 3/2004 | Armbrudt et al. |
| 2004/0110012 A1 | 6/2004 | Bier et al. |

FOREIGN PATENT DOCUMENTS

| | | | |
|---|---|---|---|
| CA | 2102170 | 5/1994 | |
| DE | 3828098 | 3/1990 | |
| DE | 3836815 | 7/1990 | |
| DE | 4020316 | 1/1992 | |
| DE | 4025215 | 2/1992 | |
| DE | 19909877 | 9/2000 | |
| DE | 19940858 | 3/2001 | |
| EP | 365027 | 10/1989 | |
| EP | 450624 | 4/1991 | |
| EP | 450625 | 4/1991 | |
| EP | 594142 | 10/1993 | |
| EP | 682033 | 3/1995 | |
| EP | 1036827 | 3/2000 | |
| JP | 2000-264948 | * | 9/2000 |

OTHER PUBLICATIONS

English Language Abstract for DE3836815 from EPO, Jul. 26, 1990.
English Language Abstract for EP365027 from EPO, Apr. 25, 1990.
English Language Abstract for EP450625 from EPO, Oct. 9, 1991.
English Language Abstract for DE3828098 from EPO, Mar. 8, 1990.
English Language Abstract for DE4020316 from EPO, Jan. 9, 1992.
English Language Abstract for DE4025215 from EPO, Feb. 13, 1992.
Chemical Abstracts, vol. 84, No. 18, May 3, 1976, Accession No. 123536, abstract for JP50095388.

* cited by examiner

… … …

POLYSILOXANE SOLS METHOD FOR THE PRODUCTION AND USE THEREOF

CROSS REFERENCE TO RELATED APPLICATIONS

This application is a National Phase Application of Patent Application PCT/EP02/14796 filed on 30 Dec. 2002, which claims priority to DE 102 00 929.5, filed on 12 Jan. 2002.

The present invention relates to novel polysiloxane sols. The present invention also relates to a novel process for preparing polysiloxane sols. The present invention additionally relates to the use of the novel polysiloxane sols as coating materials, adhesives, and sealing compounds or as constituents of coating materials, adhesives, and sealing compounds.

Polysiloxane sols have been known for a long time: refer, for example, to the patent applications DE 199 10 876 A1, DE 38 36 815 A1, DE 198 43 581 A1, DE 199 09 877 A1, DE 139 40 858 A1, DE 198 16 136 A1, EP 0 365 027 A2 or EP 0 450 625 A1. The known polysiloxane sols are sold, for example, under the brand name Ormocer® (organically modified ceramic) and are used to produce comparatively thin, scratch-resistant coatings.

In the preparation of polysiloxane sols from a plurality of starting products, such as silanes, for example, which each carry a strongly hydrophilic or hydrophobic substituent, there is a risk that, when the hydrolyzable silicon compounds are mixed with water, two phases will form. Of these phases, the lower is rich in water and hydrophilic silicon compounds while the upper phase contains the hydrophobic silicon compounds. Whereas in the lower phase, owing to the excess of water, uncontrolled hydrolysis or gelling may occur, the upper phase is largely removed from alteration by reactions. In this case, the polysiloxane sols obtained are unusable with regard to their chemical composition and processing properties. This problem is particularly serious if carbamate-functional silicon compounds are used.

The European patent application EP 0 832 947 A2 discloses the surface modification of nanoparticles with carbamate-functional silicon compounds, such as the reaction product of 3-isocyanatopropyl-1-trimethoxysilane and hydroxypropyl carbamate. The surface-modified nanoparticles are used as additives in clearcoat materials. The known clearcoat materials give comparatively thick, highly scratch-resistant clear-coats whose scratch resistance does not, however, approach the level of the clearcoats produced from the polysiloxane sols.

It is an object of the present invention to provide novel polysiloxane sols which no longer have the disadvantages of the prior art but which instead, with a comparatively small fraction of organic constituents, such as binders, crosslinking agents, and other typical coatings additives, give highly scratch-resistant coatings with a comparatively high coat thickness, which is advantageous and necessary for their technical function. The novel clearcoats in particular are to have high gloss, high clarity, high condensation resistance, outstanding intercoat adhesion, particularly high scratch resistance, and very good weathering stability and chemical resistance.

It is a further object of the present invention to provide a novel process for preparing polysiloxane sols which likewise no longer have the disadvantages of the prior art but instead, reliably and safely, gives polysiloxane sols without the risk of two phases forming in the reaction mixture.

The invention accordingly provides the novel polysiloxane sols preparable by hydrolysis and condensation of at least two hydrolyzable silicon compounds, by subjecting (1) in a first stage
  (A) at least one silicon compound of the general formula I:

$$(Z_oL-)_m Si(H)_n(R)_p \qquad (I),$$

which is free of carbamate groups and in which the indices and the variables have the following meanings:
  o is an integer from 1 to 5;
  m is 0, 1, 2 or 3;
  n is an integer from 1 to 4;
  p is 0, 1, 2 or 3;
  Z is a reactive functional group, excluding carbamate group;
  L is an at least divalent, linking, organic group;
  H is a hydrolyzable, monovalent, organic group or hydrolyzable atom;
  R is a nonhydrolyzable, monovalent, organic group;
  to partial hydrolysis and condensation in the presence
  (B) of at least one crosslinking agent, and then subjecting
(2) in at least one further stage, the reaction mixture (1) obtained in stage (1) to complete hydrolysis and condensation with
  (C) at least one hydrolyzable, carbamate-functional silicon compound of the general formula II:

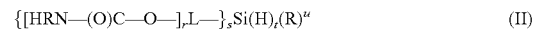

$$\{[HRN-(O)C-O-]_r L-\}_s Si(H)_t(R)_u \qquad (II)$$

in which the variables L, H, and R are as defined above and the indices have the following meanings:
  r is an integer from 1 to 5;
  s is 1, 2 or 3;
  t is 1, 2 or 3;
  u 0, 1 or 2.

In the text below, the novel polysiloxane sols preparable by hydrolysis and condensation of at least two silicon compounds are referred to as "sols of the invention".

The invention also provides the novel process for preparing polysiloxane sols by hydrolysis and condensation of at least two hydrolyzable silicon compounds, which comprises subjecting (1) in a first stage
  (A) at least one silicon compound of the general formula I:

$$(Z_oL-)_m Si(H)_n(R)_p \qquad (I),$$

which is free of carbamate groups and in which the indices and the variables have the following meanings:
  o is an integer from 1 to 5;
  m is 0, 1, 2 or 3;
  n is an integer from 1 to 4;
  p is 0, 1, 2 or 3;
  Z is a reactive functional group, excluding carbamate group;
  L is an at least divalent, linking, organic group;
  H is a hydrolyzable, monovalent, organic group or hydrolyzable atom;
  R is a nonhydrolyzable, monovalent, organic group;
  to partial hydrolysis and condensation in the presence
  (B) of at least one crosslinking agent, and then subjecting
(2) in a further stage, the reaction mixture (1) obtained in stage (1) to complete hydrolysis and condensation with (C) at least one hydrolyzable, carbamate-functional silicon compound of the general formula II:

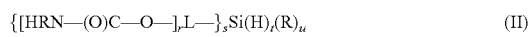 (II)

in which the variables L, H, and R are as defined above and the indices have the following meanings:
r is an integer from 1 to 5;
s is 1, 2 or 3;
t is 1, 2 or 3;
u 0, 1 or 2.

In the text below, the novel process for preparing polysiloxane sols by hydrolysis and condensation of at least two hydrolyzable silicon compounds is referred to as "process of the invention".

The invention further provides for the novel use of the sols of the invention as coating materials, adhesives, and sealing compounds, especially as clearcoat materials, for producing highly scratch-resistant coatings, adhesive films, and seals, especially clearcoats.

The invention not least provides for the novel use of the sols of the invention as constituents of coating materials, adhesives, and sealing compounds, especially of clearcoat materials, for producing coatings, adhesive films, and seals, especially clearcoats.

The invention further provides for the novel use of the sols of the invention for producing moldings, especially optical moldings, and self-supporting films.

Further subject matter of the invention will emerge from the description.

In the light of the prior art it was surprising and unforeseeable for the skilled worker that the object on which the present invention was based could be achieved by means of the sols of the invention. A particular surprise was that the sols of the invention could be prepared and stored at room temperature, which was a great advantage in terms of logistics, apparatus, process engineering, and safety.

In particular it was surprising that with the process of the invention the reaction mixture no longer formed two phases.

Even more surprising was that the sols of the invention, even without the addition of customary and known binders, gave comparatively thick coatings, especially clearcoats, of high gloss, high clarity, high condensation resistance, outstanding intercoat adhesion, particularly high scratch resistance, and of very good weathering stability and chemical resistance.

A surprise overall was the exteremely broad applicability of the sols of the invention, spanning a range from pigmented and unpigmented coating materials via pigmented and unpigmented adhesives through pigmented and unpigmented sealing compounds.

The sols of the invention are preparable by means of the process of the invention.

In the process of the invention, a first stage (1) involves subjecting at least one, especially one, silicon compound (A) of the general formula I, which is free of carbamate groups, to partial hydrolysis and condensation in the presence of at least one, especially one, crosslinking agent (B).

In the case of the partial hydrolysis and condensation, there still remain sufficient reactive functional groups in the resulting sol or reaction mixture (1) for the complete hydrolysis and condensation in at least one further stage (2).

The partial hydrolysis and condensation in stage (1) is preferably conducted at temperatures below 40° C., more preferably below 35° C., with particular preference below 30° C., and in particular at room temperature.

The first essential starting product in stage (1) is the hydrolyzable silicon compound (A) of the general formula I which is free of carbamate groups.

In the general formula I, the indices have the following meanings:
o is an integer from 1 to 5, especially 1;
m is 0, 1, 2 or 3, preferably 1, especially 0;
n is an integer from 1 to 4, preferably from 1 to 3, especially 3; and
p is 0, 1, 2 or 3, preferably from 1 to 3, especially 1.

The variable Z stands for a reactive functional group, excluding a carbamate group.

The groups Z are preferably selected from the group consisting of
(Z1) reactive functional groups containing at least one bond which can be activated with actinic radiation, and
(Z2) reactive functional groups which undergo thermally initiated reactions with groups of their kind ("with themselves") and/or with complementary reactive functional groups.

Here and below, actinic radiation means electromagnetic radiation, such as near infrared (NIR), visible light, UV radiation, and X-rays, especially UV radiation, or electromagnetic radiation, such as electron beams.

Examples of suitable bonds which can be activated with actinic radiation are carbon-hydrogen single bonds or carbon-carbon, carbon-oxygen, carbon-nitrogen, carbon-phosphorus or carbon-silicon single bonds or double bonds. Of these, the double bonds, especially the carbon-carbon double bonds ("double bonds") are employed with preference.

Very suitable double bonds are present, for example, in (meth)acrylate, ethacrylate, crotonate, cinnamate, vinyl ether, vinyl ester, ethenylarylene, dicyclopentadienyl, norbomenyl, isoprenyl, isopropenyl, allyl or butenyl groups; ethenylarylene ether, dicyclopentadienyl ether, norbomenyl ether, isoprenyl ether, isopropenyl ether, allyl ether or butenyl ether groups; or ethenylarylene ester, dicyclopentadienyl ester, norbomenyl ester, isoprenyl ester, isopropenyl ester, allyl ester or butenyl ester groups (Z1). Of these (meth)acrylate groups (Z1) are of particular advantage.

The reactive functional groups (Z2) are preferably selected from the group consisting of blocked isocyanate groups, urea groups, epoxide groups, groups —CH$_2$OR in which R is as defined below and in particular stands for methyl, ethyl, n-propyl, and n-butyl; carboxyl groups, and anhydride groups. Suitable blocking agents for the isocyanate groups are the blocking agents described in the German patent application DE 199 24 172 A1, page 5 line 64 to page 6 line 28.

In the general formula I, furthermore, the variable R stands for a nonhydrolyzable monovalent organic group.

The groups R are preferably selected from the group consisting of monovalent groups which derive from at least one of the following organic compounds:
(i) substituted and unsubstituted, linear or branched alkanes, alkenes, cycloalkanes, cycloalkenes, alkylcycloalkanes, alkylcycloalkenes, alkenylcycloalkanes or alkenylcycloalkenes which contain no heteroatom or at least one heteroatom in the chain and/or in the ring;
(ii) substituted and unsubstituted aromatics or heteroaromatics; and
(iii) alkyl-, alkenyl-, cycloalkyl-, cycloalkenyl-, alkylcycloalkyl-, alkylcycloalkenyl-, alkenylcycloalkyl- or alkenylcycloalkenyl-substituted aromatics or heteroaromatics whose substituents are substituted or unsubstituted and which contain no heteroatom or at least one heteroatom in their chain and/or their ring.

Examples of suitable heteroatoms are oxygen, nitrogen, boron, silicon, sulfur or phosphorus atoms.

Examples of suitable substituents for the abovementioned groups R are halogen atoms, especially fluorine and chlorine atoms, nitro groups or nitrile groups, and the substituents described in the German patent application DE 199 10 876 A1, page 2 lines 42 to 45.

Examples of suitable aromatics are benzene and naphthalene.

Examples of suitable heteroaromatics are thiophene, pyridine or triazine. Examples of suitable alkanes are those having from 2 to 20 carbon atoms in the molecule such as ethane, propane, butane, isobutane, pentane, neopentane, hexane, heptane, octane, isooctane, nonane, dodecane, hexadecane or eicosane.

Examples of suitable alkenes are ethylene and propylene.

Examples of suitable cycloalkanes are cyclopentane and cyclohexane.

Examples of suitable cycloalkenes are cyclopentene and cyclohexene.

Examples of suitable alkylcycloalkanes are methylcyclopentane and methylcyclohexane.

Examples of suitable alkylcycloalkenes are methylcyclopentene and methylcyclohexene.

Examples of suitable alkenylcycloalkanes are allyl- and vinylcyclopentane and allyl- and vinylcyclohexane.

Examples of suitable alkenylcycloalkenes are vinylcyclopentene and vinylcyclohexene.

Examples of suitable alkyl, alkenyl, cycloalkyl, cycloalkenyl, alkylcycloalkyl, alkylcycloalkenyl, alkenylcycloalkyl or alkenylcycloalkenyl substituents are methyl, ethyl, propyl, isopropyl, n-butyl, sec-butyl, tert-butyl, vinyl, allyl, cyclohexyl, cyclohexenyl, 4-methylcyclohexyl, 4-methylcyclohexenyl, 3-allylcyclohexenyl or 4-vinylcyclohexenyl.

Further examples of suitable groups R are known from the German patent application DE 199 10 876 A1, page 2 lines 40 to 42.

The groups R preferably derive from organic compounds which per se are unsubstituted or whose substituents are unsubstituted.

Advantageously, these compounds also contain no heteroatoms in their chains and/or in their rings and/or in the chains and/or rings of their substituents.

Particular advantages result if the groups R derive from linear alkanes which meet the abovementioned advantageous conditions. Further advantages result if they derive from methane, ethane, propane, butane, pentane or hexane, especially methane and ethane.

The variable L in the general formula I stands for an at least divalent, especially divalent, linking, organic group.

The divalent organic linking groups L are preferably selected from the group consisting of at least divalent, especially divalent, aliphatic, aromatic, cycloaliphatic, and aromatic-cycloaliphatic, and also heteroatom-containing aliphatic, aromatic, cycloaliphatic, and aromatic-cycloaliphatic, hydrocarbon radicals.

Examples of suitable groups L are (1) substituted or unsubstituted, preferably unsubstituted, linear or branched, preferably linear, alkanediyl radicals having from 4 to 30, preferably from 5 to 20, and in particular 6 carbon atoms which within the carbon chain may also contain cyclic groups, especially trimethylene, tetramethylene, pentamethylene, hexamethylene, heptamethylene, octamethylene, nonane-1,9-diyl, decane-1,10-diyl, undecane-1,11-diyl, dodecane-1,12-diyl, tridecane-1,13-diyl, tetradecane-1,14-diyl, pentadecane-1,15-diyl, hexadecane-1,16-diyl, heptadecane-1,17-diyl, octadecane-1,18-diyl, nonadecane-1,19-diyl or eicosane-1,20-diyl, preferably tetramethylene, pentamethylene, hexamethylene, heptamethylene, octamethylene, nonane-1,9-diyl, decane-1,10-diyl, 2-heptyl-1-pentylcyclohexane-3, 4-bis(non-9-yl), cyclohexane-1,2-, -1,4- or -1,3-bis(methyl), cyclohexane-1,2-, -1,4- or -1,3-bis(eth-2-yl), cyclohexane-1,3-bis(prop-3-yl) or cyclohexane-1,2-, -1,4- or -1,3-bis(but-4-yl);

(2) divalent polyester radicals comprising repeating polyester units of the formula —(—CO—(CHR$^3$)$_x$—CH$_2$—O—)—. The index x here is preferably from 4 to 6 and the substituent R$^3$=hydrogen or an alkyl, cycloalkyl or alkoxy radical. No substituent contains more than 12 carbon atoms;

(3) linear polyether radicals, preferably having a number-average molecular weight of from 400 to 5000, in particular from 400 to 3000, which derive from poly(oxyethylene) glycols, poly(oxypropylene) glycols, and poly(oxybutylene) glycols;

(4) linear siloxane radicals such as are present, for example, in silicone rubbers, hydrogenated polybutadiene radicals or polyisoprene radicals, random or alternating butadiene-isoprene copolymer radicals or butadiene-isoprene graft copolymer radicals, which may also contain copolymerized styrene, and also ethylene-propylene-diene radicals;

(5) phen-1,4-, -1,3- or -1,2-ylene, naphth-1,4-, -1,3-, -1,2-, -1,5- or -2,5-ylene, propane-2,2-di(phen-4'-yl), methanedi(phen-4'-yl), biphenyl-4,4'-diyl or 2,4- or 2,6-tolylene; or (6) cycloalkanediyl radicals having from 4 to 20 carbon atoms, such as cyclobutane-1,3-diyl, cyclopentane-1,3-diyl, cyclohexane-1,3- or -1,4-diyl, cycloheptane-1,4-diyl, norbornane-1,4-diyl, adamantane-1,5-diyl, decalindiyl, 3,3,5-trimethylcyclohexane-1,5-diyl, 1-methylcyclohexane-2,6-diyl, dicyclohexylmethane-4,4'-diyl, 1,1'-dicyclohexane-4,4'-diyl or 1,4-dicyclohexylhexane-4,4"-diyl, especially 3,3,5-trimethylcyclohexane-1,5-diyl or dicyclohexylmethane-4,4'-diyl.

Particular preference is given to using the linking groups L (1), with very particular preference trimethylene, tetramethylene, pentamethylene, hexamethylene, heptamethylene or octamethylene, and especially trimethylene.

In the general formula I, the variable H stands for a hydrolyzable, monovalent, organic group or for a hydrolyzable atom.

The hydrolyzable, monovalent, organic groups H are preferably selected from the group consisting of radicals of the general formula V:

—X—R    (V)

in which the variable R is as defined above and the variable X stands for an oxygen atom, a sulfur atom, an oxycarbonyl group or a group >NR$^2$, (where R$^2$=hydrogen atom or alkyl group having from 1 to 4 carbon atoms); and the hydrolyzable atoms H are selected from the group consisting of hydrogen atoms and halogen atoms, especially chlorine and bromine. Preferably, the variable X stands for an oxygen atom.

Examples of highly suitable hydrolyzable silicon compounds (A) are 3-isocyanatopropyltrimethoxysilane, -triethoxysilane, -dimethoxyethoxysilane, -methoxy-diethoxysilane, di(3-isocyanatopropyl)dimethoxysilane, -diethoxysilane and -methoxy-ethoxy-silane, and tris(3-isocyanatopropyl)methoxysilane and -ethoxysilane, especially 3-isocyanatopropyltriethoxysil, which have been blocked with a stoichiometric amount of the blocking agents described above; 3-glycidyloxypropyltrimethoxysilane, methyltriethoxysilane, methyltrimethoxysilane, tetramethyl orthosilicate, tetraethyl orthosilicate, dimethyl-, diethyl-, dipropyl-, methylethyl-, methylpropyl- and ethylpropyldimethoxysilane, dimethyl-, diethyl-, dipropyl-, methylethyl-, methylpropyl- and ethylpropyldiethoxysilane, dimethyl-, diethyl-, dipropyl-, methylethyl-, methylpropyl- and ethylpropyldipropoxysilane, dimethyl-, diethyl-, dipropyl-, methylethyl-, methylpropyl- and ethylpropylmethoxyethoxysilane, dimethyl-, diethyl-, dipropyl-, methylethyl-, methylpropyl- and ethylpropylmethoxypropoxysilane, and also dimethyl-, diethyl-, dipropyl-, methylethyl-, methylpropyl- and ethylpropylethoxypropoxysilane. Further examples are known from the European patent application EP 0 872 500 A1, page 4 lines 37 to 49. Particular preference is given to using methyltriethoxysilane in conjunction where appropriate with 3-glycidyloxypropyltrimethoxysilane.

The amount of hydrolyzable silicon compounds (A) used for preparing the sols of the invention by the process of the invention may vary widely and is guided by the requirements of the case in hand. The hydrolyzable silicon compounds (A) are used preferably in an amount of from 1 to 50%, more preferably from 2 to 45%, with particular preference from 3 to 40%, with very particular preference from 4 to 35%, and in particular from 5 to 30% by weight, based in each case on the overall amount of all starting products in stages (1) and (2).

The further essential starting product in stage (1) is at least one, especially one, crosslinking agent (B). Suitable basically are all crosslinking agents such as are commonly used for one-component systems. Examples of suitable crosslinking agents (B) are known from the German patent application DE 199 24 172 A1, page 5 line 64 to page 6 line 63. The crosslinking agents (B) are preferably selected from the group consisting of blocked polyisocyanates, tris(alkoxycarbonylamino)triazines, polyepoxides, amino resins, and polyanhydrides. Particular preference is given to employing amino resins.

The amount of crosslinking agent (B) used in stage (1) may vary widely and is guided by the requirements of the case in hand, in particular by the functionality of the crosslinking agent (B). It is used preferably in an amount of from 5 to 60%, more preferably from 10 to 55%, with particular preference from 15 to 50%, with very particular preference from 20 to 45%, and in particular from 25 to 45% by weight, based in each case on the sum of all the starting products in stages (1) and (2).

The third essential starting product in stage (1) is water. The amount of water may vary widely and is guided by the requirements of the case in hand, in particular by the functionality of the other starting products, particularly of the hydrolyzable silicon compounds (A) which are free of carbamate groups. The amount of water is preferably from 1 to 20%, more preferably from 2 to 18%, with particular preference from 3 to 14%, with very particular preference from 4 to 12%, and in particular from 6 to 10% by weight, based in each case on the sum of all the starting products in stages (1) and (2).

The amount of water is metered in in such a way as to avoid local excess concentrations. This may be regulated by way of the rate of addition or achieved, for example, by introducing the water into the reaction mixture with the aid of moisture-laden adsorbents, e.g., silica gel or molecular sieves, hydrous organic solvents, e.g., 80% ethanol, or salt hydrates, e.g., $CaCl_2 \times 6H_2O$. Preferably, however, deionized water is employed.

In the partial hydrolysis and condensation in stage (1) it is also possible for at least one of the compounds (D) to (G) described below to be present as a starting product.

Accordingly, the hydrolysis and condensation may take place in the presence of at least one hydrolyzable metal compound (D) of the general formula III $$H_v MR_{w-v} \quad (III)$$

in which the indices v and w are an integer between 1 and 4 with the proviso that v+w=2, 3 or 4, especially 3 or 4, M is tin, boron, aluminum, titanium or zirconium, especially aluminum, and the variables H and R are as defined above.

Examples of suitable hydrolyzable metal compounds (D) of the general formula III are known, for example, from European patent application EP 0 450 625 A1, page 4 line 47 to page 5 line 32, it being possible to use the vanadinyl compounds mentioned therein instead of or in addition to the hydrolyzable metal compounds (D).

Particular preference is given to using aluminum tri-sec-butoxide.

Where used, the amount of hydrolyzable metal compounds (D) of the general formula III may vary widely and is guided by the requirements of the case in hand. The hydrolyzable metal compounds (D) are used preferably in an amount of from 1 to 25%, more preferably from 2 to 22%, with particular preference from 3 to 20%, with very particular preference from 4 to 18%, and in particular from 5 to 15% by weight, based in each case on the overall amount of all the starting products in stages (1) and (2).

Furthermore, the partial hydrolysis and condensation in stage (1) may be conducted in the presence of at least one organic thio compound (E) of the general formula IV $$S(-LY_o)_2 \quad (IV)$$

in which the index o and the variable L are as defined above and the variable Y stands for a hydroxyl group or a primary or secondary amino group.

Examples of especially suitable organic thio compounds (E) are bis(6-hydroxyhexyl), bis(5-hydroxypentyl), bis(4-hydroxybutyl), bis(3-hydroxypropyl) and bis(2-hydroxyethyl) sulfide (thiodiethanol).

Where used, the amount of organic thio compounds (E) of the general formula IV that is used for preparing the sols of the invention by the process of the invention may vary widely and is guided by the requirements of the case in hand.

In the context of the process of the invention, the partial hydrolysis and condensation in stage (1) may be accompanied by a complexation. In this case the complexing agents (F) are selected from the group consisting of organic compounds which form chelate ligands. They preferably comprise nonaromatic organic compounds. The organic compounds (F) contain at least two functional groups which are able to coordinate to metal atoms or metal ions. These functional groups normally comprise electron donors, which donate electrons to metal atoms or metal ions as electron acceptors. Suitable for the process of the invention are, in principle, all organic compounds (F) of said kind provided they do not adversely affect, let alone prevent entirely, the hydrolysis and condensation and/or the crosslinking to give the finished coating. Examples of suitable organic compounds (F) are dimethylglyoxime or compounds containing carbonyl groups in positions 1 and 3, such as acetylacetone or ethyl acetoacetate. For further details, refer to Römpp Chemie Lexikon, Georg Thieme Verlag, Stuttgart, 1989, volume 1, page 634.

Where used, the amount of complexing agents (F) that is used for preparing the sols of the invention by the process of the invention may vary widely and is guided by the requirements of the case in hand. The complexing agents (F) are used preferably in an amount of from 1 to 25%, more preferably from 2 to 22%, with particular preference from 2.5 to 20%, with very particular preference from 3 to 18%, and in particular from 3.5 to 15% by weight, based in each case on the overall amount of all the starting products in stages (1) and (2).

The partial hydrolysis and condensation and also, where appropriate, the complexation of the above-described starting products in stage (1) may be conducted if desired in the presence of solvents, preferably aromatic-free solvents. It is preferred to operate without solvent.

The partial hydrolysis and condensation and also, where appropriate, the complexation of the above-described starting products in stage (1) may be conducted if desired in the presence of a hydrolysis and condensation catalyst (G).

Suitable hydrolysis and condensation catalysts (G) include proton-donating or hydroxyl ion-donating compounds and amines. Specific examples are organic or inorganic acids, such as hydrochloric acid, sulfuric acid, phosphoric acid, formic acid or acetic acid, and organic or inorganic bases such as ammonia, alkali metal or alkaline earth metal hydroxides, e.g., sodium, potassium or calcium hydroxide, and amines soluble in the reaction medium, examples being lower alkylamines or alkanolamines. Where catalysts (G) are used, particular preference is given to volatile acids and bases, especially hydrochloric acid, acetic acid, ammonia or triethylamine.

The reaction mixture (1) resulting in stage (1) of the process of the invention is admixed in at least one, especially one, further stage (2) with at least one, especially one, hydrolyzable, carbamate-functional silicon compound (C) of the general formula II and water, as a result of which the hydrolysis and condensation proceeds completely to give the sol of the invention.

The hydrolysis and condensation in stage (2) is preferably conducted at temperatures below 40° C., preferably 35° C., with particular preference 30° C., and in particular at room temperature.

In the general formula II, the variables L, H, and R are as defined above. The variable $R^1$ and the indices have the following meanings:

$R^1$ is hydrogen atom or group R, especially hydrogen atom;
r is an integer from 1 to 5, especially 1;
s is 1, 2 or 3, especially 1;
t is 1, 2 or 3, especially 3; and
u is 0, 1 or 2, especially 0.

Examples of suitable hydrolyzable, carbamate-functional silicon compounds (C) are 3-O-carbamatopropyl-trimethoxysilane, -triethoxysilane, -tripropoxysilane, and -tributoxysilane or the reaction product of 3-isocyanatopropyltrimethoxysilane and hydroxypropyl carbamate that is described in the European patent application EP 0 832 947 A1, page 8 lines 8 to 17.

The amount of the hydrolyzable, carbamate-functional silicon compound (C) used in stage (2) may vary widely and is guided by the requirements of the case in hand, in particular by the number of carbamate groups which are to be present in the sol of the invention and by the functionality of the other starting products. The amount is preferably from 5 to 40%, more preferably from 6 to 35%, with particular preference from 7 to 30%, with very particular preference from 8 to 25%, and in particular from 10 to 20% by weight, based in each case on the sum of all the starting products in stages (1) and (2).

To complete the hydrolysis and condensation, water as well is added in stage (2), using the methods described above. The amount of water used in stage (2) may vary widely and is guided by the requirements of the case in hand, in particular by the functionality of the other starting products. It is preferred to use from 0.5 to 10%, more preferably from 0.7 to 9%, with particular preference from 0.8 to 8%, with very particular preference from 1 to 7%, and in particular from 1.5 to 6% by weight, based in each case on the sum of all the starting products in stages (1) and (2).

The sols of the invention may further comprise customary and known, typical coatings additives (H) in effective amounts, which can be added to the sols of the invention preferably following their preparation. Suitable additives (H) are all those which do not adversely affect, but instead advantageously vary and improve, the profile of properties of the coatings, adhesive films, and seals produced from the sols of the invention, particularly the optical properties (appearance) and scratch resistance of the coatings. Examples of suitable additives (H) of this kind are known from the German patent application DE 199 24 172 A1, page 5 line 22 to page 7 line 48 or the German patent application DE 199 14 896 A1, column 11 line 6 to column 15 line 54.

Where the sols of the invention are to be used to produce color and/or effect coatings, they comprise at least one pigment as additive (H). The pigments (H) are preferably selected from the group consisting of customary and known organic and inorganic color and/or effect, electrically conductive, magnetically shielding, and fluorescent pigments and customary and known organic and inorganic fillers.

In addition, the sols of the invention may further comprise customary and known, typical coatings binders (J). Examples of suitable binders (J) are random, alternating and/or block, linear and/or branched and/or comb, addition (co)polymers of ethylenically unsaturated monomers, polyaddition resins and/or polycondensation resins. For further details of these terms, refer to Rmpp Lexikon Lacke und Druckfarben, Georg Thieme Verlag, Stuttgart, N.Y., 1998, page 457, "polyaddition" and "polyaddition resins (polyadducts)", and also pages 463 and 464, "polycondensates", "polycondensation", and "polycondensation resins", and also pages 73 and 74, "binders".

Examples of suitable addition (co)polymers (J) are (meth)acrylate (co)polymers or partially hydrolyzed polyvinyl esters, especially (meth)acrylate copolymers.

Examples of suitable polyaddition resins and/or polycondensation resins (J) are polyesters, alkyds, polyurethanes, polylactones, polycarbonates, polyethers, epoxy resin-amine adducts, polyureas, polyamides, polyimides, polyester-polyurethanes, polyether-polyurethanes or polyester-polyetherpolyurethanes, especially polyester-polyurethanes.

The solids content of the sols of the invention may vary very widely and is guided by the particular intended use. Where the sols of the invention are to be used, for example, as unpigmented coating materials for producing thin, highly scratch resistant coatings with a coat thickness <5 μm, the solids content is preferably below 50%, more preferably below 40%, with particular preference below 30%, and in particular below 20% by weight, based on the respective sol of the invention. Where the sols of the invention are to be used, for example, as clearcoat materials, the solids content is preferably from 10 to 90%, more preferably from 15 to 85%, with particular preference from 20 to 80%, with very particular preference from 25 to 75%, and in particular from 30 to 70% by weight, based on the respective sol of the invention. Advantageous solids contents of sols of the invention which are to be put to other end uses may be set by the skilled worker on the basis of his or her general art knowledge, where appropriate with the assistance of simple preliminary tests.

Viewed in terms of its method, the preparation of the sol of the invention by means of the process of the invention has no special features but is instead carried out using customary and known apparatus, such as stirred vessels, tube reactors or extruders.

The sols of the invention may be used as coating materials, adhesives, and sealing compounds for producing coatings, adhesive films, and seals. In addition, they may be used to produce moldings, especially optical moldings, and self-supporting films. In general, they are suitable for all end uses such as are described in the German patent application DE 198 16 136 A1, column 7 line 40 to column 8 line 57. They are preferably used as coating materials for producing pigmented and unpigmented, especially unpigmented, coatings. In this case, the sols of the invention give comparatively thick, highly scratch-resistant coatings which adhere firmly to a very wide variety of substrates.

In particular, they serve to produce single-coat or multicoat clearcoat systems and/or multicoat color and/or effect paint systems on primed and unprimed substrates.

Specifically in the context of this use, the sols of the invention prove particularly advantageous. Very particular advantages result when they are used to produce clearcoat systems, especially as part of the technique known as the wet-on-wet technique, in which a basecoat material, especially an aqueous basecoat material, is applied to the primed or unprimed substrate and dried but not cured and then a clearcoat material is applied to the basecoat film and the resulting clearcoat film is cured together with the basecoat film, thermally and with actinic radiation.

The multicoat paint systems of the invention may be produced in a variety of inventive ways.

A first preferred variant of the coating process of the invention comprises the steps of
(I) preparing a basecoat film by applying an aqueous basecoat material to the substrate,
(II) drying the basecoat film,
(III) preparing a clearcoat film by applying the sol of the invention to the basecoat film, and
(IV) curing the basecoat film and the inventive clearcoat film together to give the basecoat and the inventive clearcoat (wet-on-wet technique).

This variant offers particular advantages especially when coating plastics and is therefore employed with particular preference in that utility.

A second preferred variant of the coating process of the invention comprises the steps of
(I) preparing a surfacer film by applying a surfacer to the substrate,
(II) curing the surfacer film to give the surface coat,
(III) preparing a basecoat film by applying an aqueous basecoat material to the surfacer coat,
(IV) drying the basecoat film,
(V) preparing the inventive clearcoat film by applying the sol of the invention to the basecoat film, and
(VI) curing the basecoat film and the inventive clearcoat film together to give the basecoat and the inventive clearcoat (wet-on-wet technique).

A third preferred variant of the coating process of the invention comprises the steps of
(I) preparing a surfacer film by applying a surfacer to the substrate,
(II) drying the surfacer film,
(III) preparing a basecoat film by applying an aqueous basecoat material to the surfacer film,
(IV) drying the basecoat film,
(V) preparing the inventive clearcoat film by applying the sol of the invention to the basecoat film, and
(VI) curing the surfacer film, the basecoat film and the inventive clearcoat film together to give the surfacer coat, the basecoat and the inventive clearcoat (extended wet-on-wet technique).

A fourth preferred variant of the coating process of the invention comprises the steps of
(I) depositing an electrocoat film on the substrate,
(II) drying the electrocoat film,
(III) Preparing a first basecoat film by applying a first basecoat material to the electrocoat film,
(IV) curing the electrocoat film and the first basecoat film together to give the electrocoat and the first basecoat (wet-on-wet technique),
(V) preparing a second basecoat film by applying a second basecoat material to the first basecoat,
(VI) drying the second basecoat film,
(VII) preparing the inventive clearcoat film by applying the sol of the invention to the basecoat film, and
(VIII) curing the second basecoat film and the inventive clearcoat film together to give the second basecoat and the inventive -clearcoat (wet-on-wet technique).

The three last-mentioned variants offer particular advantages especially for the OEM finishing of automobile bodies and are therefore employed with very particular preference in that utility.

It is a very particular advantage of the coatings produced from the sol of the invention that they exhibit outstanding adhesion even to ready-cured electrocoats, surfacer coats, basecoats or customary and known clearcoats, so making them of outstanding suitability for automotive refinishing or for scratchproofing exposed areas of painted automobile bodies.

Suitable substrates include all surfaces to be coated, bonded and/or sealed that are not damaged by curing of the films present thereon under the combined application of heat and actinic radiation.

Suitable substrates consist of metals, plastics, wood, ceramic, stone, textile, fiber composites, leather, glass, glass fibers, glass wool and rock wool, mineral-bound and resin-bound building materials, such as plasterboard panels and cement slabs or roof shingles, and also composites of these materials.

Accordingly, the sols of the invention are outstandingly suitable for the coating, bonding, and sealing of motor vehicle bodies or parts thereof, the interior and exterior of motor vehicles, the inside and outside of buildings, furniture, windows, and doors, and, in the context of industrial coating, for the coating, bonding, and sealing of small parts, such as nuts, bolts, hub caps or wheel rims, coils, containers, packaging, electrical components, such as motor windings or transformer windings, and white goods, such as domestic appliances, boilers, and radiators, or hollow glassware.

In the case of electrically conductive substrates it is possible to use primers which in a customary and known manner are produced from electrocoat materials. Both anodic and cathodic electrocoat materials are suitable for this purpose, but especially cathodics.

It is also possible to coat, bond or seal primed or unprimed plastics parts made, for example, of ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM, and UP (abbreviations to DIN 7728T1). Nonfunctionalized and/or nonpolar substrate surfaces may be subjected prior to coating in a known manner to a pretreatment, such as with a plasma or by flaming, or may be provided with a water-based primer.

The sols of the invention may be applied by any customary methods, such as spraying, knife coating, brushing, flowcoating, dipping, impregnating, trickling or rolling, for example. The substrate to be coated may itself be at rest, with the application equipment or unit being moved. However, it is also possible for the substrate to be coated, especially a coil, to be moved, with the application unit being at rest relative to the substrate or being moved appropriately.

Preference is given to the use of spray application methods, such as, for example, compressed air spraying, airless spraying, high-speed rotation, electrostatic spray application (ESTA), alone or in conjuction with hot spray application such as hot air spraying, for example. Application may take place at temperatures of max. 70 to 80° C., so that appropriate application viscosities are attained without any change or damage to the sol of the invention and its overspray (which may be intended for reprocessing) during the short period of thermal stress. Hot spraying, for instance, may be configured in such a way that the dual-cure coating material is heated only very briefly in the spray nozzle or shortly before the spray nozzle.

The spray booth used for the application may be operated, for example, with a circulation system, which may be temperature-controllable, and which is operated with a suitable absorption medium for the overspray, an example of such medium being the sol of the invention itself.

Where the sol of the invention includes constituents which can be cured using actinic radiation, application is carried out with illumination using visible light having a wavelength of more than 550 nm, or in the absence of light. By this means, material alteration or damage to the dual-cure coating material and the overspray are avoided.

In general, the electrocoat film, surfacer film, basecoat film, and inventive clearcoat film are applied in a wet film thickness such that curing thereof results in coats having the thicknesses which are advantageous and necessary for their functions. In the case of the electrocoat this thickness is from 10 to 70 µm, preferably from 10 to 60 µm, with particular preference from 15 to 50 µm, and in particular from 15 to 45 µm; in the case of the surfacer coat it is from 10 to 150 µm, preferably from 10 to 120 µm, with particular preference from 10 to 100 µm, and in particular from 10 to 90 µm; in the case of the basecoat it is from 5 to 50 µm, preferably from 5 to 40 µm, with particular preference from 5 to 30 µm, and in particular from 10 to 25 µm; and in the case of the inventive clearcoats it is from 10 to 100 µm, preferably from 15 to 80 µm, with particular preference from 20 to 70 µm, and in particular from 25 to 60 µm. It is also, however, possible to employ the multicoat system known from the European patent application EP 0 817 614 A1 and composed of an electrocoat, a first basecoat, a second basecoat, and an inventive clearcoat, in which the total thickness of the first and second basecoats is from 15 to 40 µm and the thickness of the first basecoat is from 20 to 50% of said total thickness.

Curing may take place after a certain rest period. This period may have a duration of from 30 s to 2 h, preferably from 1 min to 1 h, and in particular from 1 min to 30 min. The rest period serves, for example, for the leveling and devolatilization of the applied films or for the evaporation of volatile constituents such as solvents or water. The rest period may be shortened and/or assisted by the application of elevated temperatures up to 80° C., provided this does not entail any instances of damage to or alteration of the applied films, such as premature complete crosslinking.

In accordance with the invention, curing takes place with actinic radiation, especially UV radiation, and/or electron beams. If desired, this curing may be carried out or supplemented with actinic radiation from other radiation sources. In the case of electron beams it is preferred to operate under an inert gas atmosphere. This may be ensured, for example, by supplying carbon dioxide and/or nitrogen directly to the surface of the applied films.

In the case of curing of UV radiation as well it is possible to operate under inert gas in order to prevent the formation of ozone. It is preferred to operate under an oxygen-depleted atmosphere.

Curing with actinic radiation is carried out using the customary and known radiation sources and optical auxiliary measures. Examples of suitable radiation sources are high or low pressure mercury vapor lamps, with or without lead doping in order to open up a radiation window up to 405 nm, or electron beam sources. Their arrangement is known in principle and may be adapted to the circumstances of the workpiece and the process parameters.

In the case of workpieces of complex shape, such as automobile bodies, those regions not accessible to direct radiation (shadow regions) such as cavities, folds, and other structural undercuts may be cured using pointwise, small-area or all-round emitters, in conjunction with an automatic movement device for the irradiation of cavities or edges.

The equipment and conditions for these curing methods are described, for example, in R. Holmes, U.V. and E.B. Curing Formulations for Printing Inks, Coatings and Paints, SITA Technology, Academic Press, London, United Kingdom 1984. Further examples of suitable methods and apparatus for curing with actinic radiation are described in the German patent application DE 198 18 735 A1, column 10 lines 31 to 61.

Curing here may take place in stages, i.e., by multiple exposure to light or actinic radiation. It may also take place alternatingly, i.e., by curing alternately with UV radiation and electron beams.

Thermal curing also has no special features as far as its method is concerned but instead takes place in accordance with the customary and known methods, such as heating in a forced air oven or irradiation with IR lamps. As in the case of curing with actinic radiation, thermal curing may also take place in stages. Advantageously, thermal curing takes place at a temperature >90° C., preferably from 90 to 180° C., with particular preference from 110 to 160° C., and in particular from 120 to 150° C., for a time of from 1 min up to 2 h, with particular preference from 2 min up to 1 h, and in particular from 3 min to 30 min.

Thermal curing and curing with actinic radiation may be employed simultaneously or in alternation. Where the two curing methods are used in alternation it is possible, for example, to commence with thermal cure and to end with the actinic radiation cure. In other cases it may prove advantageous to begin and to end with the actinic radiation cure. The skilled worker is able to determine the curing method that is most advantageous for the case in hand on the basis of his or her general art knowledge, where appropriate with the assistance of simple preliminary tests.

The adhesive films and seals of the invention produced from the sols of the invention exhibit outstanding bond strength and sealing capacity even under extreme and/or rapidly changing climatic conditions and even over long periods of time.

The coatings of the invention produced from the sols of the invention exhibit excellent leveling and have an outstanding overall appearance. They are stable to weathering and do not yellow even in a tropical climate. They may therefore be used in the interior and exterior sectors.

The multicoat color and/or effect paint systems produced by means of the sols of the invention are, as far as color, effect, gloss, and DOI (distinctness of the reflected image) are concerned, of the utmost optical quality, have a smooth, textureless, hard, flexible, and highly scratch-resistant surface, are resistant to weathering, chemicals, and etching, do not yellow, and show no cracking or delamination of the coats.

Accordingly, the coatings of the invention have an outstanding ability to increase scratch resistance, abrasion resistance, and corrosion resistance, to enhance cleaning properties and demolding, to reduce sticking, to produce an antifogging effect and antireflection properties, and/or to raise the bursting pressure.

Accordingly, the primed and unprimed substrates of the invention, particularly bodies of automobiles and commercial vehicles, industrial components, including plastics parts, small parts, packaging, coils, white goods, and electrical components, or furniture, doors, windows or hollow glassware, that are coated with at least one coating of the invention, sealed with at least one seal of the invention and/or bonded with at least one adhesive of the invention, have particular technical and economic advantages, in particular a long service life, which makes them particularly attractive to users.

EXAMPLES

Examples 1 and 2

The Preparation of the Inventive Sols 1 and 2

For Examples 1 and 2, aluminum tri-sec-butoxide and methyltriethoxysilane were charged to a suitable stirred vessel and an equimolar amount of ethyl acetoacetate, based on aluminum tri-sec-butoxide, was added. The addition was made in such a way that the temperature of reaction mixture did not exceed 30° C. Then a commercial amino resin (Resimene® BM 9539) and, where appropriate, 3-glycidyloxypropyltrimethoxysilane were added and were incorporated by stirring for ten minutes. Water was then added at a rate such that the temperature did not rise above 30° C. The resulting reaction mixture was stirred at room temperature until homogeneous.

To the reaction mixture there was added 3—O-carbamatopropyltrimethoxysilane. The reaction mixture was then admixed with further water at a rate such that the temperature did not rise above 30° C. The resulting inventive sol was stirred at room temperature for 24 hours.

The starting products and their amounts are given in Table 1.

TABLE 1

The starting products of the inventive sols 1 and 2 and their amounts

| | Examples: | | | |
|---|---|---|---|---|
| | 1 | | 2 | |
| Starting product | mol | % by weight | mol | % by weight |
| Stage (1): | | | | |
| Aluminum tri-sec-butoxide | 0.2 | 11.1 | 0.2 | 10.8 |
| Methyltriethoxysilane | 0.5 | 20.2 | 0.3 | 11.8 |
| Ethyl acetoacetate | 0.2 | 5.9 | 0.2 | 5.7 |
| Amino resin | — | 35.5 | — | 34.6 |
| 3-Glycidyloxypropyltrimethoxysilane | — | — | 0.2 | 10.4 |
| Water | 2.1 | 8.5 | 2.1 | 8.3 |
| Stage (2): | | | | |
| 3-O-Carbamatopropyl-trimethoxysilane | 0.3 | 15.1 | 0.3 | 14.8 |
| Water | 0.9 | 3.7 | 0.9 | 3.6 |
| Sum of the starting products of stages (1) and (2) | 4.2 | 100 | 4.2 | 100 |
| Solids content (15 minutes at 180° C.) (% by weight) | — | 46.2 | — | 47.4 |

The inventive sols of Examples 1 and 2 were outstandingly suitable for producing thick, highly scratch-resistant coatings for a very wide variety of substrates. Despite their preparation at room temperature they were extremely stable on storage without having to be cooled. This was particularly advantageous from the standpoint of logistics, apparatus, process engineering, and safety. Moreover, there was no separation, with the formation of two phases, during their preparation.

Examples 3 to 6

The Preparation of Inventive Clearcoat Materials and Production of Inventive Multicoat Paint Systems therefrom For the preparation of the inventive clearcoat materials of Examples 3 to 6, the inventive sols were admixed with typical coatings additives. Table 2 gives an overview of the material composition.

TABLE 2

The material composition (in % by weight) of the inventive clearcoat materials of Examples 3 to 6

| | Examples: | | | |
|---|---|---|---|---|
| Constituent | 3 | 4 | 5 | 6 |
| Sol of Example 1 | 80.75 | 93.6 | — | — |
| Sol of Example 2 | — | — | 81.15 | 93.75 |
| Crosslinking agent[a)] | 13.75 | — | 13.45 | — |
| Commercial coatings additive[b)] | 0.25 | 0.3 | 0.25 | 0.3 |
| Commercial coatings additive[c)] | 0.25 | 0.3 | 0.25 | 0.3 |
| Crosslinking catalyst[d)] | 5.0 | 5.8 | 4.9 | 5.65 |

[a)]trimeric hexamethylene diisocyanate blocked with diethyl malonate and ethyl acetoacetate;
[b)]Byk ® 390 from Byk Chemie;
[c)]Byk ® 310 from Byk Chemie;
[d)]Nacure ® 5528 from King Industries.

The clearcoat materials of Examples 3 to 6 were adjusted with butyl acetate to a viscosity of 18 seconds in the DIN A4 flow cup, and sieved (mesh size 31 μm). They were used to produce clearcoats in multicoat paint systems.

For producing multicoat paint systems, steel test panels coated with electrocoats in a dry coat film thickness of from 18 to 22 μm were coated with a water-based surfacer. The resulting water-based surfacer films were baked at 165° C. for 20 minutes to give surfacer coats with a dry thickness of from 35 to 40 μm. The surfacer coats were then coated with a black aqueous basecoat material with a film thickness of from 12 to 15 μm, and the resulting aqueous basecoat films were flashed off at 80° C. for 10 minutes. The clearcoat materials of Examples 3 and 4 were then applied wet-on-wet pneumatically using a gravity-feed cup gun in one cross pass. The clearcoat films were flashed off at room temperature for 5 minutes.

The aqueous basecoat films and the clearcoat films were subsequently cured thermally in a forced air oven at 140° C. for 20 minutes.

The inventive multicoat paint systems were tested as follows:

Gloss and haze were determined in accordance with DIN 67530.

The intercoat adhesion was tested by means of the cross-cut test to DIN ISO 2409; 1994-10.

The micropenetration hardness was measured as the universal hardness at 25.6 mN using a Fischerscope 100 V with Vickers diamond pyramid.

The scratch resistance was determined by means of the steel wool test. For this purpose, the flat side of a fitter's hammer according to DIN 1041 was wrapped with one ply of steel wool. The hammer was then carefully placed at right angles on the clearcoats and, without tilting and without additional physical force, was guided in a track over the clearcoats. For each test, 10 double strokes had to be performed for 15 seconds. The damage was rated visually as follows:

| Rating | Damage, visual |
|---|---|
| 1 | no scratches |
| 2 | small number of scratches |
| 3 | moderate number of scratches |
| 4 | moderately severe number of scratches |
| 5 | large number of scratches |
| 6 | very many scratches |

Additionally, the visual damage was assessed after 200 double strokes, and the depth of the scratches was determined qualitatively.

The performance properties determined in this way are collated in Table 3.

TABLE 3

Important performance properties of the multicoat paint systems of Examples 3 to 6

| Property | Examples | | | |
|---|---|---|---|---|
| | 3 | 4 | 5 | 6 |
| Gloss (units): | 89 | 90 | 88 | 92 |
| Haze (units): | 22 | 18 | 15 | 13 |
| Cross-cut test (rating): | GT1 | GT1 | GT1 | GT1 |
| Micropenetration hardness (mN): | 185.7 | 196.2 | 149.8 | 154.1 |
| Scratch resistance to steel wool: | | | | |
| (10 double strokes) (rating): | 2 | 2 | 3 | 3 |
| (200 double strokes) (rating): | 4 | 2 | 4 | 4 |

TABLE 3-continued

Important performance properties of the multicoat paint systems of Examples 3 to 6

| Property | Examples | | | |
|---|---|---|---|---|
| | 3 | 4 | 5 | 6 |
| Depth of scratches after 200 double strokes (qualitative): | s. | s. | s. | s. | s. superficial

The results collated in Table 3 show that the inventive multicoat paint systems had high gloss, low haze, very good intercoat adhesion, very good hardness, and particularly high scratch resistance.

What is claimed is:

1. A polysiloxane aol comprising a product of a hydrolysis and condensation process of at least two hydrolyzable silicon compounds, wherein the process comprises subjecting (1) in a first stage
(A) at least one silicon compound of the general formula I:

$$(Z_oL—)_mSi(H)_n(R)_p \qquad (I),$$

which is free of carbamate groups and in which the indices and the variables have the following meanings:

o is an integer from 1 to 5;
m is 0, 1, 2 or 3;
n is an integer from 1 to 4;
p is 0, 1, 2 or 3;
Z is a reactive functional group, excluding carbamate group;
L is an at least divalent, linking, organic group;
H is a hydrolyzable, monovalent, organic group or hydrolyzable atom;
R is a nonhydrolyzable, monovalent, organic group;
wherein m+n+p=4:
to partial hydrolysis and condensation in the presence of
(B) at least one crosslinking agent, and then subjecting
(2) in at least one further stage, the reaction mixture (1) obtained in stage (1) to complete hydrolysis and condensation with
(C) at least one hydmlyzable, carbamate-functional silicon compound of the general formula II:

$$\{(HR^1N—(O)C—O—)_rL—\}_sSi(H)_t(R)_u \qquad (II)$$

in which the variables L, H, and R are as defined above and the variable $R^1$ and the indices have the following meanings:

$R^1$ is a hydrogen atom or group R;
r is an integer from 1 to 5;
s is 1, 2 or 3;
t is 1, 2 or 3;
u 0, 1 or 2;
wherein s+t+u=4.

2. The polysiloxane sol of claim 1, further comprising subjecting in the first stage (1) the silicon compound (A) to partial hydrolysis and condensation in the presence of (D) at least one hydrolyzable metal compound of the general formula III:

$$H_vMR_{w-v} \qquad (III)$$

in which the variables H and R are as defined above and the variable M and the indices v and w have the following meanings:

v and w are an integer between 1 and 4 with the proviso that the v+w=2, 3 or 4; and M is tin, boron, aluminum, titanium or zirconium.

3. The polysiloxane sol of claim 1, further comprising subjecting in the first stage (1) the silicon compound (A) to partial hydrolysis and condensation in the presence of (E) at least one organic thio compound of the general formula IV

$$S(-LY_o)_2 \quad (IV)$$

in which the index o and the variable L are as defined above and the variable Y stands for a hydroxyl group or a primary or secondary amino group.

4. The polysiloxane sal of claim 1, wherein the polysiloxane sol is prepared by hydrolysis, condensation, and complexation.

5. The polysiloxane sol of claim 4, wherein the complexation is in the first stage (1).

6. The polysiloxane aol of claim 4, wherein complexing agents (F) comprise organic compounds which form chelate ligands.

7. A dual-cure polysiloxane sol of claim 1, wherein the reactive functional groups Z are selected from the group consisting of (Z1) reactive functional groups containing at least one bond which can be activated with actinic radiation, and (Z2) reactive functional groups which undergo thermally initiated reactions with groups of their kind, with complementary reactive functional groups, or with groups of their kind and with complementary reactive functional groups.

8. The polysiloxane sol of claim 7, wherein the bonds which can be activated with actinic radiation are carbon-hydrogen single bonds, carbon-carbon single bonds, carbon-oxygen single bonds, carbon-nitrogen single bonds, carbon-phosphorus single bonds, carbon-silicon single bonds, carbon-carbon douhonds, carbon-oxygen double bonds, carbon-nitrogen double bonds, carbon-phosphorus double bonds, or carbon-silicon double bonds.

9. The polysiloxane sol of claim 8, wherein the bonds which can be activated with actinic radiation are carbon-carbon double bonds.

10. The polysiloxane sol of claim 9, wherein the groups (Z1) containing double bonds are selected from the group consisting of (meth)acrylate groups, ethacrylate groups, crotonate groups, cinnamate groups, vinyl ether groups, vinyl ester groups, dicyclopentadienyl groups, norbomenyl groups, isoprenyl groups, isopropenyl groups, allyl groups, butenyl groups, dicyclopentadienyl ether groups, norbornenyl ether groups, isoprenyl ether groups, isopropenyl ether groups, allyl ether groups, butenyl ether groups, dicyclopentadienyl ester groups, norbornenyl ester groups, isoprenyl ester groups, isopropenyl ester groups, allyl ester groups, or butenyl ester groups.

11. The polysiloxane sol of claim 7, wherein the reactive functional groups (Z2) are selected from the group consisting of blocked isocyanate groups, urea groups, epoxide groups, —CH$_2$OR groups, carboxyl groups, and anhydride groups.

12. The polysiloxane sol of claims 1, wherein the hydrolyzable, monovalent, organic groups H are selected from the group consisting of radicals of the general formula V

$$-X-R \quad (V)$$

in which the variable R is as defined above and the variable X stands for an oxygen atom, a sulfur atom, an oxycarbonyl group or a group >NR$^2$, (where R$^2$=hydrogen atom or alkyl group having from 1 to 4 carbon atoms); and the hydrolyzable atoms H are selected from the group consisting of hydrogen atoms and halogen atoms.

13. The polysiloxane sol as claimed in claim 12, wherein the hydrolyzable, monovalent, organic groups H are selected from the group consisting of alkoxy groups having from 1 to 4 carbon atoms in the alkyl radical.

14. The polysiloxane sol of claim 1, wherein the at least divalent, linking organic groups L are at least divalent and are selected from the group consisting of aliphatic hydrocarbon radicals, aromatic hydrocarbon radicals, cycloaliphatic hydrocarbon radicals, aromatic-cycloaliphatic hydrocarbon radicals, heteroatom-containing aliphatic hydrocarbon radicals, heteroatom-containing aromatic hydrocarbon radicals, heteroatom-coritaining cycloaliphatic hydrocarbon radicals, and heteroatom-containing aromatic-cycloaliphatic hydrocarbon red icals.

15. The polysiloxane sol of claim 1, wherein the nonhydrolyzable, monovalent, organic groups R are selected from the group consisting of monovalent groups which derive from at least one of the following organic compounds:

(i) alkanes, alkenes, cycloalkanes, cycloalkenes, alkylcycloalkanes, alkylcycloalkenes, alkenylcycloalkanes or alkenylcycloalkenes, which are substituted or unsubstituted, which are linear or branched, and which contain no heteroatom or at least one heteroatom in the chain and/or in the ring;

(ii) substituted aromatics, unsubstituted aromatics, substituted heteroaromatics, or unsubstituted heteroaromatics; and/or (iii) alkyl-, alkenyl-, cycloalkyl-, cycloalkenyl-, alkylcycloalkyl-, alkyloycloalkenyl-, alkenylcycloalkyl- or alkenylcycloalkenyl-substituted aromatics or heteroaromatics whose substituents are substituted or unsubstituted and which contain no heteroatom or at least one hetematom in their chain and/or their ring.

16. The polysiloxane sol of claim 1, wherein the index m=0 and the indices n and p=from 1 to 3.

17. The polysiloxane sol of claim 1, wherein the variable R$^1$ stands for a hydrogen atom.

18. The polysiloxane sol of claim 1, wherein the indices r and s=1, the index t=3, and the index u=0.

19. The polysiloxane sol of claim 1, wherein the at least one crosslinking agents (B) Is selected from the group consisting of blocked polyisocyanates, tris(alkoxycarbonylamino)triazines, polyepoxides, amino resins, and polyanhydrides.

20. The polysiloxane sol of claim 19, wherein the at least one crosslinking agents (B) is amino resins.

21. A method comprising applying the polysiloxane sol of claim 1 to a substrate as one of a coating material, an adhesive, or a sealing compound.

22. A process for preparing a polysiloxane sol comprising a product of a hydrolysis and condensation process of at least two hydrolyzable silicon compounds, the process comprising subjecting (1) in a first stage
  (A) at least one silicon compound of the general formula I:

$(Z_o L\text{—})_m Si(H)_n(R)_p$      (I), which is free of carbamate groups and in which the indices and the variables have the following meanings:
  o is an integer from 1 to 5;
  m is 0, 1, 2 or 3;
  n is an integer from 1 to 4;
  p is 0, 1, 2 or 3;
  Z is a reactive functional group, excluding carbamate group;
  L is an at least divalent, linking, organic group;
  H is a hydrolyzable, monovalent, organic group or hydrolyzable atom;
  R is a nonhydrolyzable, monovalent, organic group;
  wherein m+n+p=4;
  to partial hydrolysis and condensation in the presence
  (B) of the at least one crosslinking agent, and then subjecting
(2) in at least one further stage, the reaction mixture (1) obtained in stage (1) to complete hydrolysis and condensation with
  (C) the at least one hydrolyzable, carbamate-functional silicon compound of the general formula II:

$\{(HR^1 N\text{—}(O)C\text{—}O\text{—})_r L\text{—}\}_s Si(H)_t(R)_u$      (II)

in which the variables L, H, and R are as defined above and the variable $R^1$ and the indices have the following meanings:
  $R^1$ is a hydrogen atom or group R;
  r is an integer from 1 to 5;
  s is 1, 2 or 3;
  t is 1, 2 or 3;
  u 0, 1 or 2;
wherein s+t+u=4.

* * * * *